(12) United States Patent
Woo

(10) Patent No.: US 11,641,099 B2
(45) Date of Patent: May 2, 2023

(54) ARC DETECTION SYSTEM

(71) Applicant: THE SLOAN COMPANY, Ventura, CA (US)

(72) Inventor: Sung-An Woo, Camarillo, CA (US)

(73) Assignee: The Sloan Company, Ventura, CA (US)

( * ) Notice: Subject to any disclaimer, the term of this patent is extended or adjusted under 35 U.S.C. 154(b) by 144 days.

(21) Appl. No.: 17/138,481

(22) Filed: Dec. 30, 2020

(65) Prior Publication Data

US 2022/0209521 A1 Jun. 30, 2022

(51) Int. Cl.
*H02H 1/00* (2006.01)
*F21V 23/00* (2015.01)
*F21Y 115/10* (2016.01)

(52) U.S. Cl.
CPC ......... *H02H 1/0015* (2013.01); *F21V 23/009* (2013.01); *F21Y 2115/10* (2016.08)

(58) Field of Classification Search
CPC .. H02H 1/0015; F21V 23/009; F21Y 2115/10
USPC ........................................ 324/536, 512, 500
See application file for complete search history.

(56) References Cited

U.S. PATENT DOCUMENTS

| | | | |
|---|---|---|---|
| 4,223,377 A | 9/1980 | Williams | |
| 5,835,319 A * | 11/1998 | Welles, II | ............ H02H 1/0015 361/93.6 |
| 6,042,248 A | 3/2000 | Hannah | |
| 6,283,612 B1 | 9/2001 | Hunter | |
| 6,556,397 B2 * | 4/2003 | Kim | ......................... H02H 3/04 361/87 |
| 6,670,626 B2 | 12/2003 | Witham | |
| 6,987,389 B1 * | 1/2006 | Macbeth | ............. H02H 1/0015 324/536 |
| 7,441,922 B2 | 10/2008 | Huang | |
| 7,490,957 B2 | 2/2009 | Leong | |
| 7,674,016 B2 | 3/2010 | Zhang | |

(Continued)

OTHER PUBLICATIONS

Office Action dated Dec. 22, 2020 for U.S. Appl. No. 16/163,440 (pp. 1-14).

(Continued)

*Primary Examiner* — Giovanni Astacio-Oquendo
(74) *Attorney, Agent, or Firm* — Jaye G. Heybl

(57) ABSTRACT

The present invention generally directed to arc detection circuits or systems that help prevent fire damage to solid state (LED) based light sources by providing an arc detection system that can be used to detect acing in LED based light fixtures. Once the arcing is detected, power can be quickly turned off to the lighting system. One arc detection circuit according to the present invention comprises a high pass filter circuit arranged to accept an electrical signal with an arc current component having one or more arcing events and a direct current (DC) component, wherein the high pass filter passes only the arc current component. An arc detection circuit is included that accepts the arc current component and filters out arcing events below a threshold. Wherein the arc detection circuit provides an arcing signal with arcing events above said threshold. A microcontroller is also included that accepts the arcing signal to generate control signals based on the arcing signal. In some embodiment, the control signals can be used to control a power supply.

16 Claims, 16 Drawing Sheets

(56) References Cited

U.S. PATENT DOCUMENTS

| | | |
|---|---|---|
| 9,404,645 B1 | 8/2016 | Feng |
| 9,470,385 B1 | 10/2016 | Ploucher |
| 10,039,178 B2* | 7/2018 | Liu .......................... H05H 1/34 |
| 10,738,948 B2 | 8/2020 | Li |
| 2005/0017732 A1* | 1/2005 | Kim ..................... H02H 1/0015 |
| | | 324/536 |
| 2006/0049368 A1 | 3/2006 | Culbert |
| 2008/0197854 A1* | 8/2008 | Valcore ............. H01J 37/32082 |
| | | 156/345.24 |
| 2009/0073693 A1 | 3/2009 | Nall |
| 2012/0008315 A1 | 1/2012 | Simon |
| 2012/0092875 A1 | 4/2012 | Cho |
| 2012/0206910 A1 | 8/2012 | Watson |
| 2013/0063944 A1 | 3/2013 | Lodhie |
| 2013/0265746 A1 | 10/2013 | May |
| 2014/0085881 A1 | 3/2014 | Clifford |
| 2015/0184807 A1 | 7/2015 | Vincent |
| 2015/0260389 A1 | 9/2015 | Caron |
| 2015/0308631 A1 | 10/2015 | Gorman |
| 2015/0345755 A1 | 12/2015 | Purdy |
| 2016/0369950 A1 | 12/2016 | Yeager |
| 2017/0074474 A1 | 3/2017 | Bailey |
| 2017/0280521 A1 | 9/2017 | Shan |
| 2020/0144230 A1 | 5/2020 | Lin |

OTHER PUBLICATIONS

Office Action dated May 24, 2021 for U.S. Appl. No. 16/163,440 (pp. 1-14).

Office Action (Non-Final Rejection) dated Oct. 14, 2021 for U.S. Appl. No. 17/183,678 (pp. 1-12).

Office Action (Notice of Allowance and Fees Due (PTOL-85)) dated Nov. 19, 2021 for U.S. Appl. No. 16/163,440 (pp. 1-8).

Office Action (Final Rejection) dated Jun. 10, 2022 for U.S. Appl. No. 17/183,078 (pp. 1-13).

* cited by examiner

ARC DETECTION SYSTEM

This application claims the benefit of U.S. Provisional Patent Application Ser. No. 62/955,240, filed on Dec. 30, 2019.

BACKGROUND OF THE INVENTION

Field of the Invention

This invention relates to arc detection systems, and more particularly, arc detection systems for LED lighting systems.

Description of the Related Art

Perimeter or border lights ("perimeter lighting") are commonly used on buildings to accentuate the structure, to draw customer attention to the building, and to provide safety lighting. Most conventional perimeter lights use neon bulbs for the light source. Some of the disadvantages of neon lighting is that neon bulbs have a relatively short life, are fragile and can consume a relatively large amount of power. Also, neon bulbs can experience difficulty with cold starting, which can lead to the bulb's failure.

Light emitting diodes (LED or LEDs) are solid state devices that convert electric energy to light, and generally comprise one or more active layers of semiconductor material sandwiched between oppositely doped layers. Typically, wire bonds are used to apply a bias across the doped layers, injecting holes and electrons into the active layer where they recombine to generate light. Light is emitted from the active layer and from all surfaces of the LED. A typical high efficiency LED comprises an LED chip mounted to an LED package and encapsulated by a transparent medium. The efficient extraction of light from LEDs and the quality of that light are major concerns in LED package fabrication.

Developments and improvements in LED technology have resulted in devices that are brighter, more efficient and more reliable. LEDs are now being used in many different applications that were previously the realm of neon or incandescent bulbs; some of these include commercial and residential lighting, architectural displays, automobile taillights and traffic signals. As the efficiency of LEDs improve it is expected that they will be used in most lighting applications.

Perimeter lighting systems have been developed so that they rely primarily on LEDs as their light source. Examples of these are described in U.S. Pat. Nos. 6,776,504, &,234, 838 and 8,511,849, all of which are assigned to the assignee of this application, and are incorporate by reference in their entirety. Some of the embodiments described in these patents can have an elongated LED array printed circuit board (PCB) that hold LEDs that are the light source for the perimeter lighting. The LED array PCB can have conductive traces for conducting the primary power (e.g. 24 volts) and the return power for the LEDs.

A relatively rare occurrence with this arrangement is that arcing can occur between the power and return traces on the PCB. Multiple arching incidents can cause the temperature of the PCB to exceed 200 degrees Celsius at particular locations, and this can cause localized burning of the PCB. This localized burning can create a carbon powder, and once enough carbon builds up, and subsequent arc can generate a fire on the PCB at the carbon powder. This rare occurrence can result in the fire damage to the PCB, perimeter lighting fixture, and the surrounding area.

SUMMARY OF THE INVENTION

The present invention generally directed to a system that prevents fire damage to solid state (LED) based light sources by providing an arc detection system that can be used to detect acing in LED based light fixtures. Once the arcing is detected, power can be quickly turned off to the lighting system. As mentioned above, arcing can cause the build-up of carbon at on the PCB where the LEDs are mounted. This removal of power to the LEDs upon arcing can prevent subsequent arcing, can prevent the build-up of carbon on the PCB and can prevent a fire from starting in the carbon powder already built-up on the PCB.

One embodiment of an arc detection circuit according to the present invention comprises a high pass filter circuit arranged to accept an electrical signal with an arc current component having one or more arcing events and a direct current (DC) component, wherein the high pass filter passes only the arc current component. An arc detection circuit is included that accepts the arc current component and filters out arcing events below a threshold. Wherein the arc detection circuit provides an arcing signal with arcing events above said threshold. A microcontroller is also included that accepts the arcing signal to generate control signals based on the arcing signal. In some embodiment, the control signals can be used to control a power supply.

The systems according to the present invention can comprise many different features as described below. These and other aspects and advantages of the invention will become apparent from the following detailed description and the accompanying drawings which illustrate by way of example the features of the invention.

DETAILED DESCRIPTION OF THE INVENTION

Figure 1:
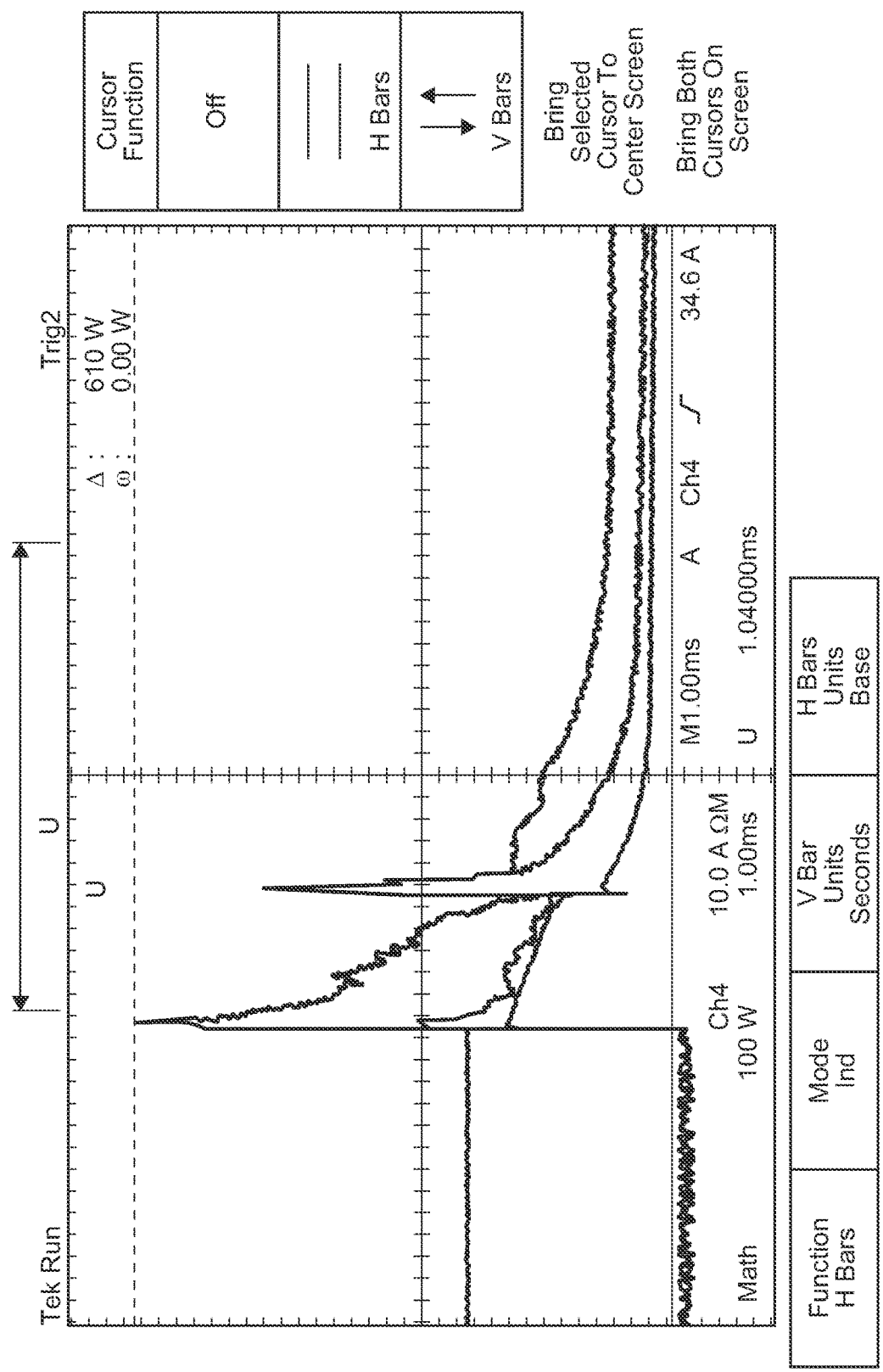
FIG. 1 is a waveform showing operation of one embodiment of an arc detection system according to the present invention.

The present invention is directed embodiments of arc detection systems that can detect arcing in a PCB holding and/or coupled to LEDs arranged in different ways in different systems. The embodiments below are described in relation to LED based displays, but can be used in different systems. This arcing presents the danger of fire within the light fixture housing the LEDs. Carbon powder can build-up on the PCB during arcing events, and if sufficient carbon powder builds up, subsequent arcing can ignite the carbon powder.

The embodiments of the present invention can detect that arcing has occurred and can discontinue or disconnect power to the circuit board and the LEDs in response to the arcing event. In some embodiments, the power can be removed after the first arcing event until the light fixture is analyzed and repaired, such as by a technician. In other embodiments, the power can be returned to the PCB after a predetermined time to again monitor for arcing. If arcing again occurs, power can again be removed from the PCB and/or LEDs. This can then be permanently removed until attended to by a technician, or the system can go through additional cycles to determine if arcing continues. After the desired number of cycles, the power will be removed until attended to by a technician.

It is understood that the different embodiments according to the present invention can comprise electronic hardware or software, or a combination of the two, to detect arcing and control power to the PCB or LEDs. In some embodiments, the hardware/software can reside fully or partially in the power supply.

The present invention is described herein with reference to certain embodiments, but it is understood that the invention can be embodied in many different forms and should not be construed as limited to the embodiments set forth herein. It is further understood that different embodiments can comprise different features, elements and components arranged in different ways. Different embodiments can also be for use in arc detection in many different systems beyond solid state lighting systems.

It will be understood that when an element is referred to as being "on" or "connected to" or "coupled to" another element, it can be directly on, in contact or coupled to the other element or intervening elements may be present. In contrast, when an element is referred to as being "directly on", or "directly connected to" or "directly coupled to" another element, there are no intervening elements present.

Although the terms first, second, etc. may be used herein to describe various elements, and/or sections, these elements and/or sections should not be limited by these terms. These terms are only used to distinguish one element, or section from another element, or section. Thus, a first element or section discussed herein could be termed a second element, or section without departing from the teachings of the present invention.

One embodiment of a system and method for detecting arcs according to the present invention comprises monitoring the functioning of a power supply driving a display. In some embodiments, the system monitors the output voltage of the power supply to the solid state light source, such as one or more LEDs. This can be accomplished using different hardware or software systems, or systems using a combination of hardware and software. This system can rely at least partially on, and monitor, the over current protection systems of the power supply that based on the characteristics or level of the over current protection, can shut down the power supply. In some embodiments, this shut down can occur if current at the output exceeds a certain threshold. For example, certain power supplies can deliver a current up to 4 amps. If current exceeds this amount, the over protection system of the power supply can shut down the power supply.

During an arcing event, the current can increase beyond the threshold of the over current protection, this result in the over current protection circuit to drop. This can be an indication of an arcing condition that can be monitored to shut down the power supply upon repeated arcing events. FIG. 1 shows waveforms at the power supply showing arcing conditions.

One potential drawback to this type of system is that the output voltage may only drop if the arc current is greater than the over current protection threshold. For example, if the power supply has a 4 amp over current protection current, the detection system or circuit may ignore an arc current of less than a 4 amp current. In some systems, the arc fire condition can occur at smaller currents than 4 amps.

Another system and method for detecting arcs according to the present invention comprises monitoring the supply current to the LED, with some embodiments constantly monitoring the supply current. If there is a significant enough difference between the previous and current supply current, this can be an indication of an arcing event and the power supply can be shut down.

Like above, this approach can be accomplished by using different hardware or software systems, or systems using a combination of hardware and software. This system/method may be an improvement over this system/method described above in that is can detect lower current arc events because it detects the current, not the voltage. One potential drawback of this approach is that the sampling rate may cause inaccuracy in detection.

Still another system and method for arc detection according to the present invention utilizes a primarily hardware circuit approach for monitoring the supply current as in the system/method described above. In this embodiment, however, the hardware circuit isolates the arc current from the supply current. Typically, the arc current is located on top of the supply current. The DC supply current is needed for normal operation, so this embodiment isolates the arc current from the DC supply current to detect an arcing event.

Figure 2:
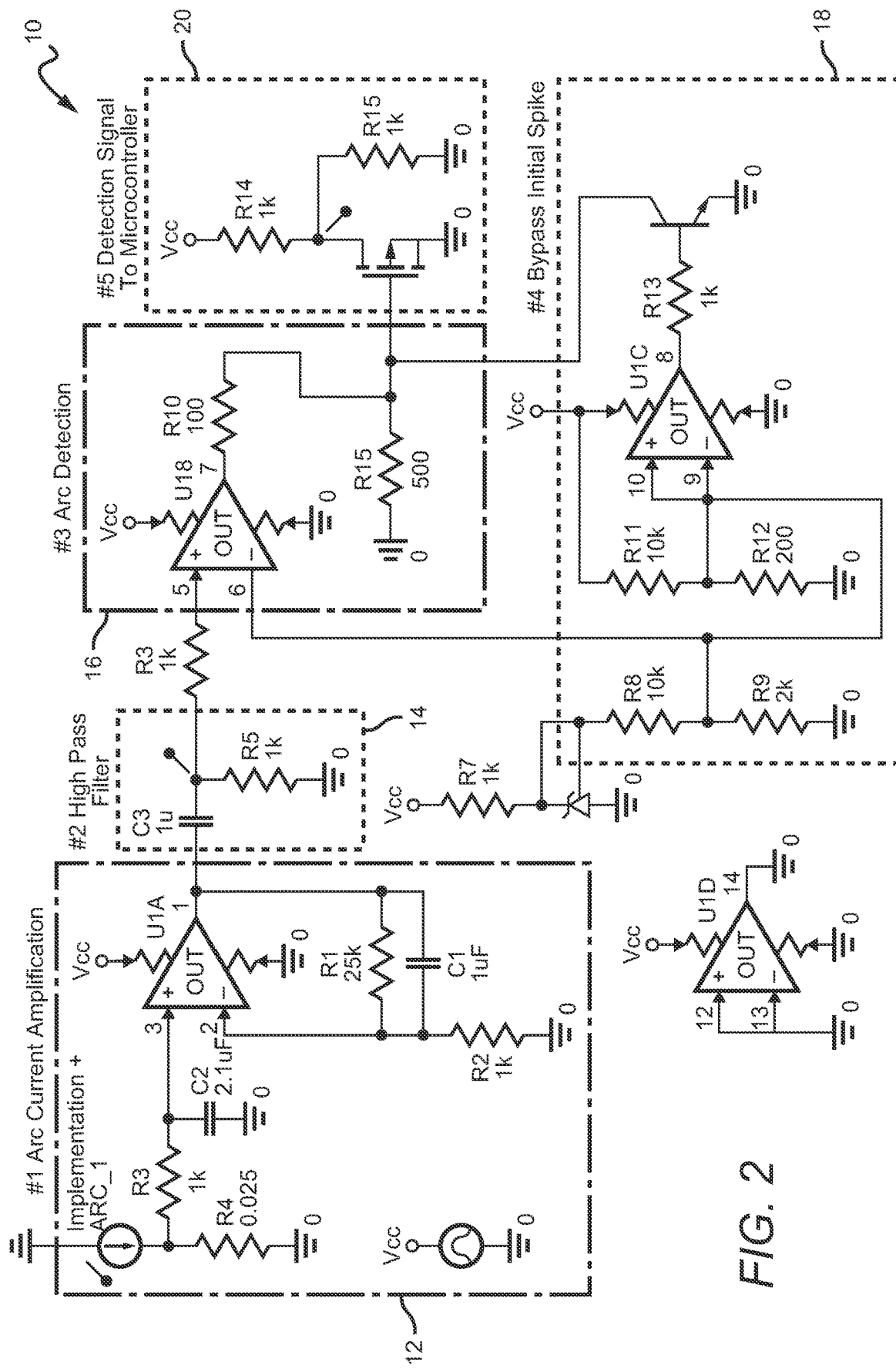
FIG. 2 is a circuit schematic of another embodiment of an arc detection system according to the present invention.

FIGS. 2-12 show one embodiment of an arc detection circuit according to the present invention, and sub-circuits, along with the different electrical signal waveforms at points in the circuit or sub-circuits. FIG. 2 shows one embodiment of a hardware arc detection circuit 10 according to the present invention. The sub-circuits in this embodiment can comprise an Arc Current Amplifier sub-circuit 12, a High Pass Filter sub-circuit 14, and Arc Detection sub-circuit 16, and a Bypass Initial Spike sub-circuit 18 and Detection Signal to Microcontroller sub-circuit 20. The sub-circuits are described in more detail below and it is understood that these sub-circuits can include different elements arranged in many different ways, and the detection circuit 10 can comprise different sub-circuits.

Figure 3:
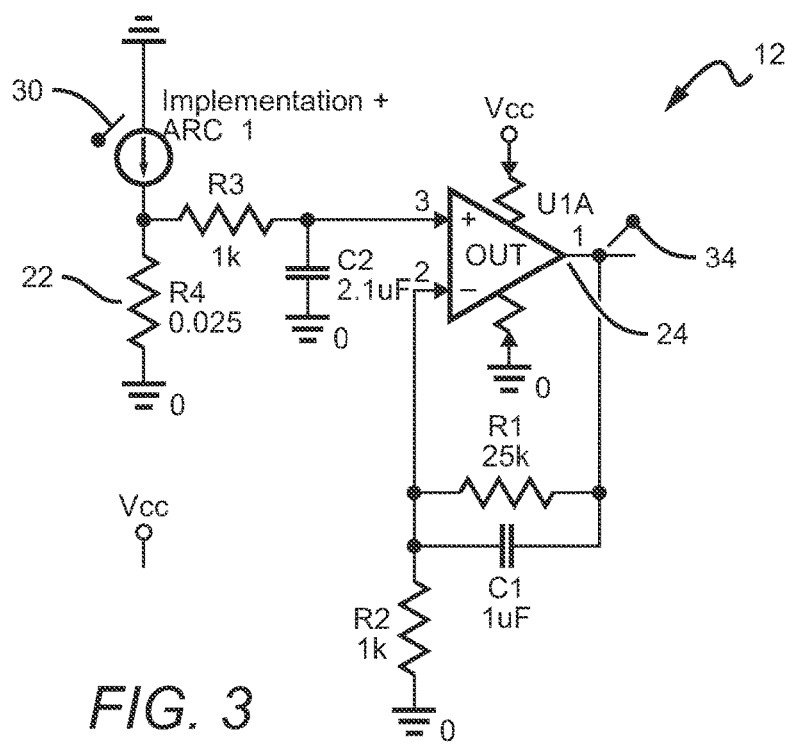
FIG. 3 is an arc current application circuit from the schematic shown in FIG. 2.

FIG. 3 shows the Arc Current Amplification sub-circuit 12 from the arc detection circuit 10 shown in FIG. 2. In some instances where the circuit 10 is monitoring for arcing condition, the arc current may be too small to be efficiently detected in the detection circuit 10. The arc current is amplified in the sub-circuit 12, and the sub-circuit 12 can use many different components arranged in many different ways to amplify the arc current. In the embodiment shown, the arc current is converted to voltage at resister 22 (R4) and then amplified by operational amplifier 24 (L324) to a level that can be utilized by the circuit 10.

Figure 4:
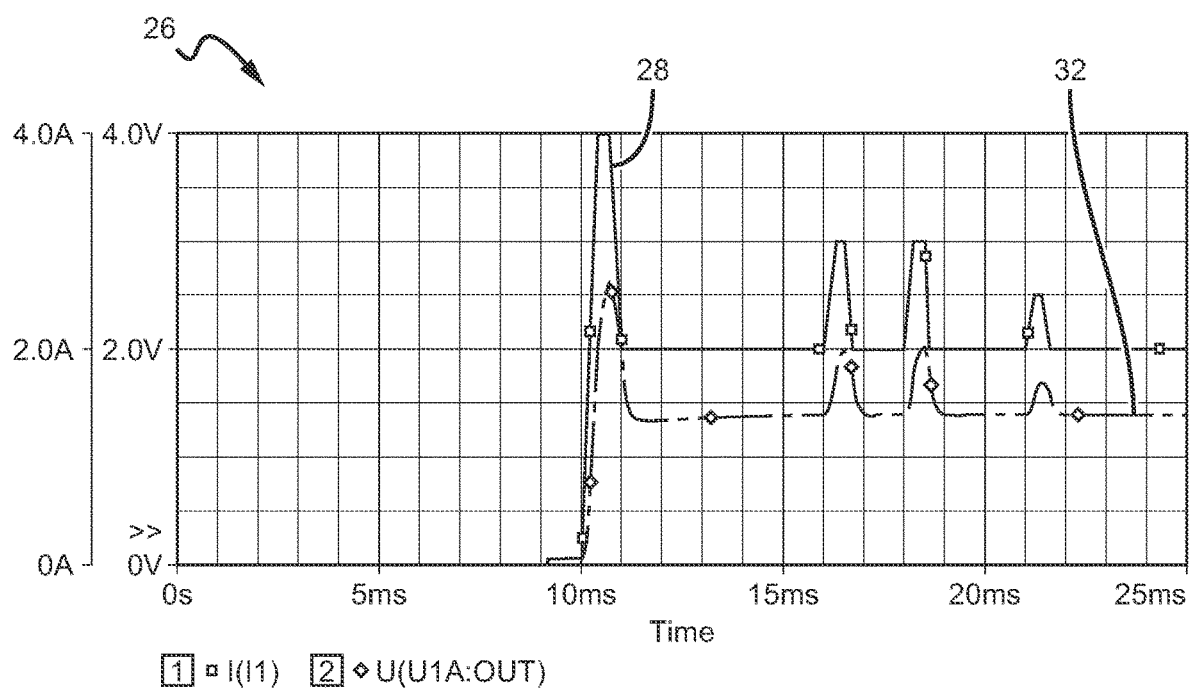
FIG. 4 is a waveform taken from two different points as shown in the circuit of FIG. 2.

FIG. 4 shows the waveforms 26 taken at different points in the sub-circuit 12 and includes a first waveform 28 taken at a first location 30 and a second waveform 32 taken at location 34. The first waveform 26 comprises the monitored arc current and DC current signal, and second 32 waveform 12 shows the corresponding amplified voltage at the output of the operation amplifier 24.

Figure 5:
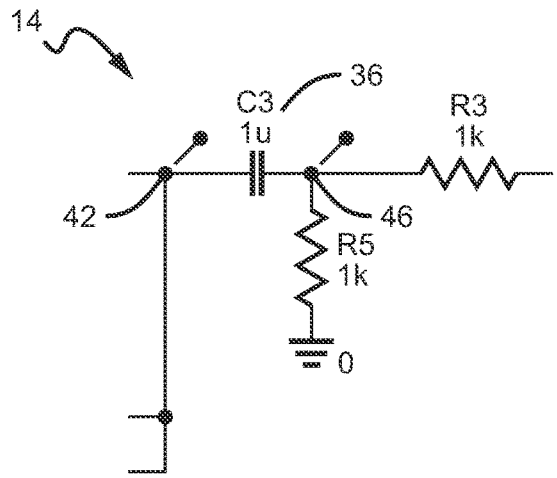
FIG. 5 is a high pass filter circuit from the schematic shown in FIG. 2.

FIG. 5 shows the High Pass Filter sub-circuit 14 from circuit 10. During normal operation, the sub-circuit 14 receives the amplified signal from sub-circuit 12 that contains both the arc spike (if any) and normal DC current components. In the embodiment shown, these two components are separated so that the arc detection circuit 10 can address only the spike current of the arc event. The sub-circuit 14 can comprise a capacitor 36 (C3} that allows only the spikes in current signal to pass, and blocks the DC component.

Figure 6:
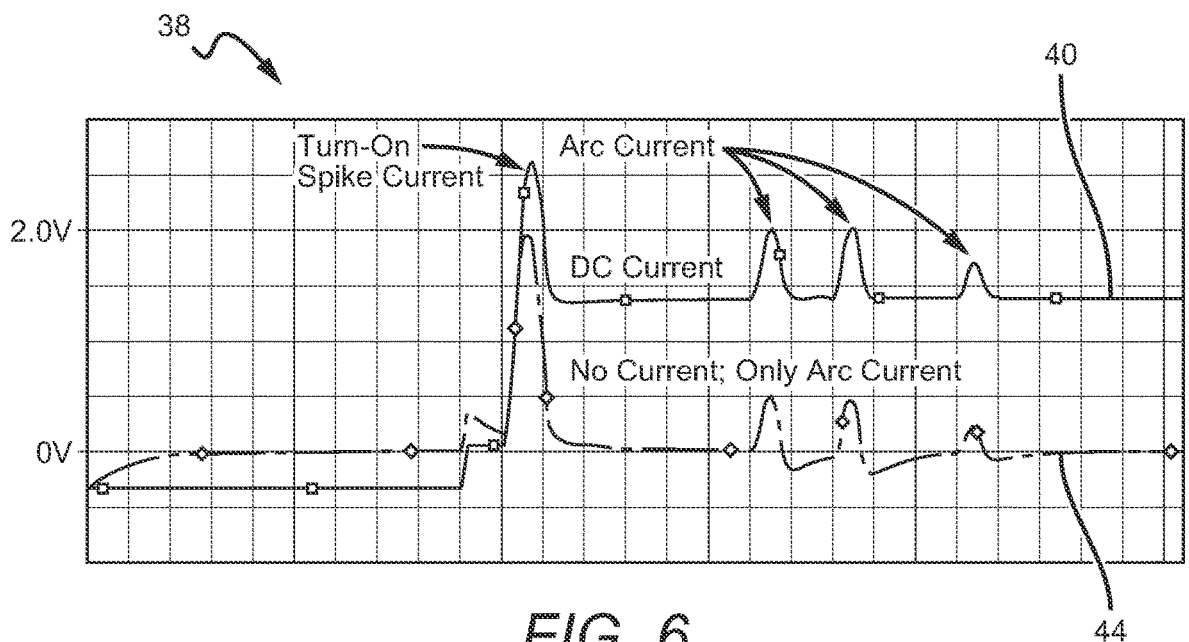
FIG. 6 is a waveform taken from two different points as shown in the circuit of FIG. 5.

FIG. 6 shows waveforms 38 at different points in the sub-circuit 14. The first waveform 40 is taken at a first point 42 prior to capacitor 36 and second waveform 44 is taken at the second point 46 after the signal passes through the capacitor 36. The first waveform 40 shows the DC and spike components before capacitor 36, and the second waveform 44 shows the waveform after at point 46 capacitor 36 with no DC current. The second waveform comprises only arc current. It is noted that both the first and second waveforms 40 and 44 include initial turn on spike currents. As discussed below, the arc detection circuits can be arranged so that this turn on spike are not considered to be arcing events by the arc detection circuit.

Figure 7:
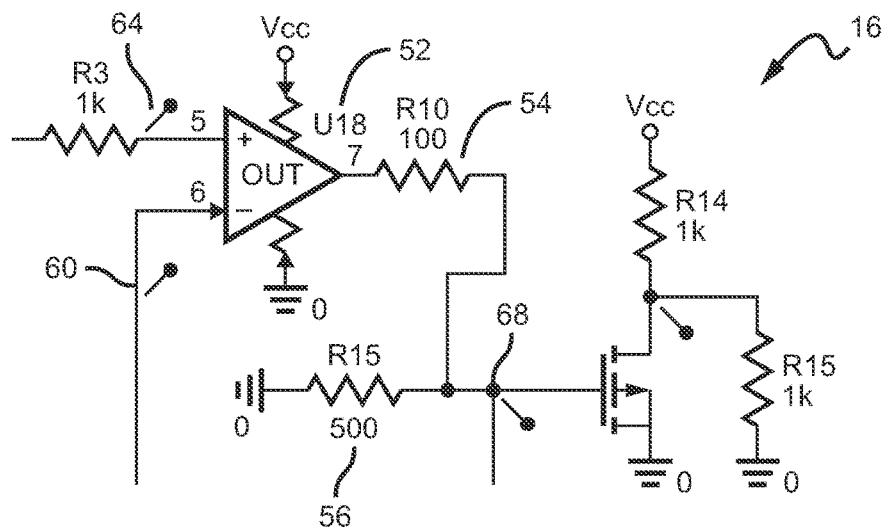
FIG. 7 is an arc detection circuit from the schematic shown in FIG. 2.
Figure 8:
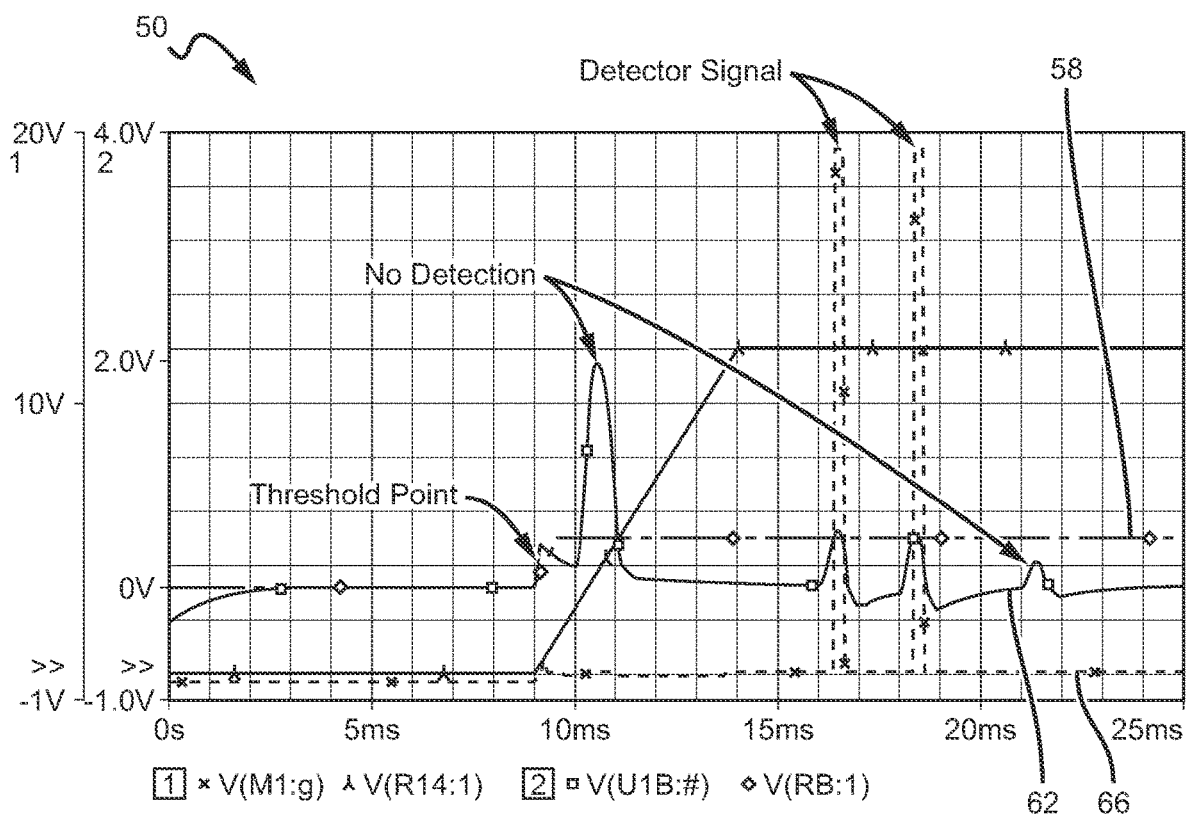
FIG. 8 is a waveform taken from three different points as shown in the circuit of FIG. 7.

FIG. 7 shows one embodiment of an Arc Detection sub circuit 16 used in the circuit 10 according to the present invention, and FIG. 8 shows the electrical signal waveforms 50 through the circuit 16 at different locations in the sub-circuit 16. Many different components can be used for the sub-circuit 16, with the embodiment shown using operational amplifier 52 and first and second resistors 54, 56.

The waveforms 50 include first waveform 58 taken and point 60 in sub-circuit 16 which corresponds to the input 6 at amplifier 52 (U1B) and second waveform 62 is taken at point 64 at the input 5 at amplifier 52, which corresponds to the output of the High Pass Filter sub-circuit 14. The waveform 58 corresponds to the threshold current signal for arc detection in the sub-circuit 16. Different embodiments can have different threshold currents to indicate an arcing event, and in the embodiment shown the threshold is 1A (0.5V) The sub-circuit 16 and detection circuit 10 only signal an alarm when the current signal exceeds this level. Third Waveform 66, which is the electrical signal taken at point 68 (between R10 and M1). shows two spikes to reflect detection signals where the arc current exceeded 1A (0.5V).

Figure 9:
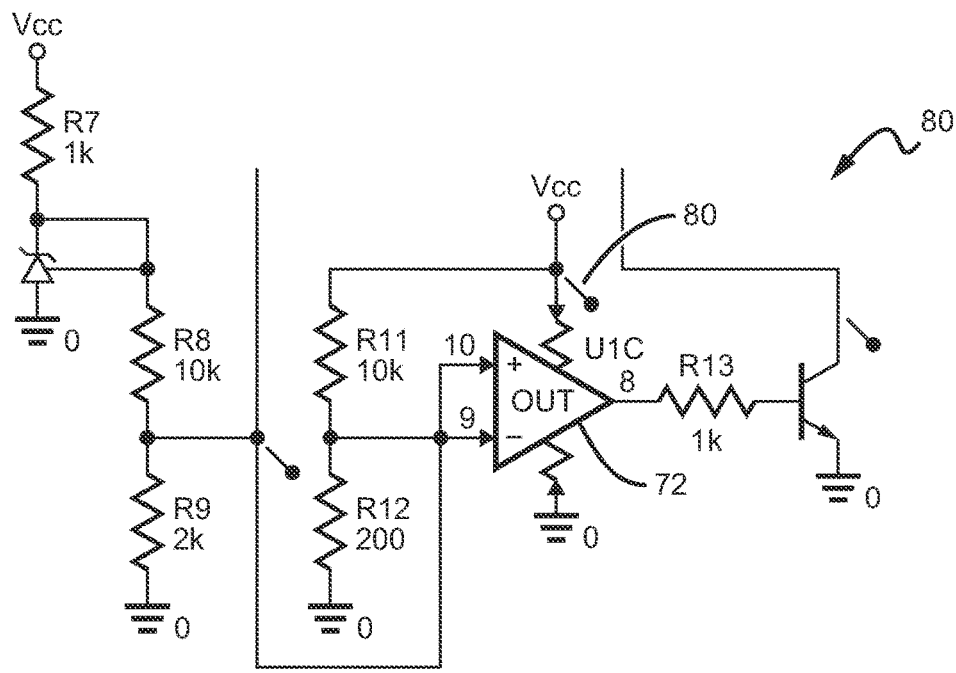
FIG. 9 is the bypass initial spike circuit from the schematic shown in FIG. 2.
Figure 10:
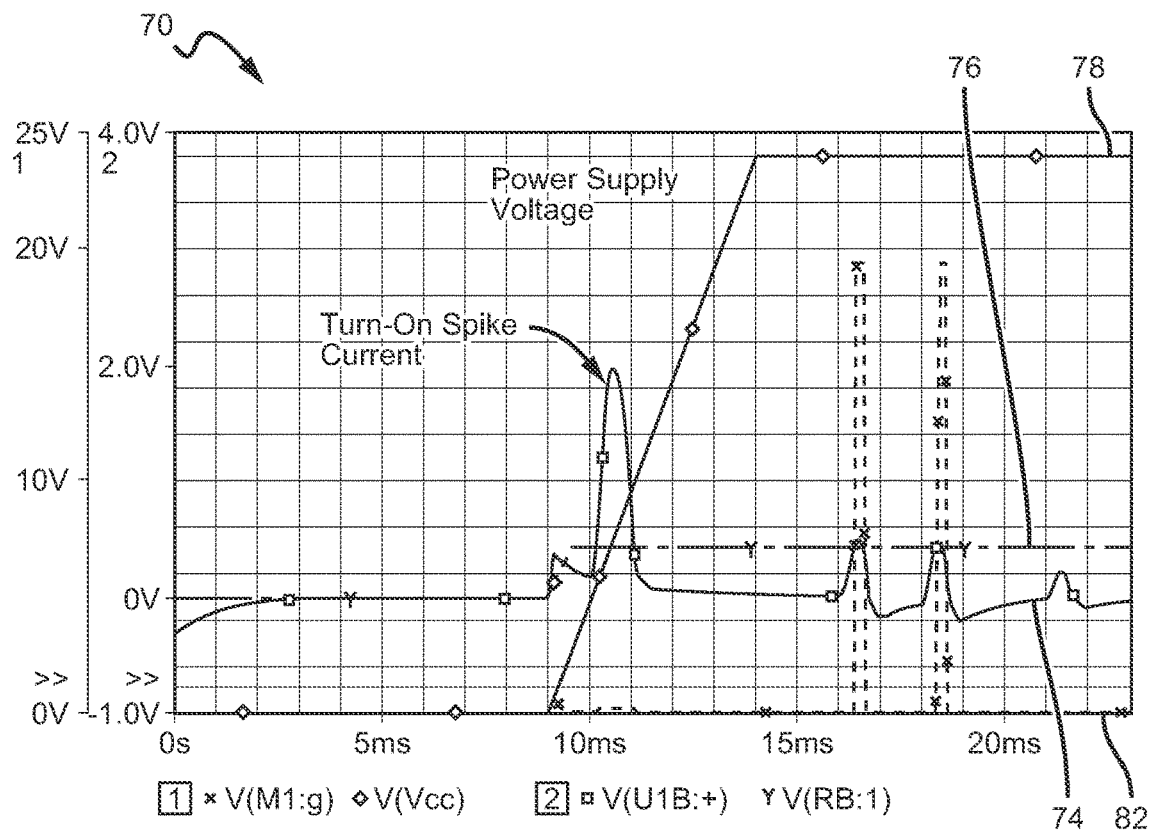
FIG. 10 is a waveform taken from three different points as shown in the circuit of FIG. 9.

FIG. 9 shows one embodiment of Bypass Turn-On Spike Current sub-circuit 18 used in the circuit 10 according to one embodiment of the present invention. and FIG. 10 shows waveform 70 of the electrical signal at different locations in the sub-circuit 18. As mentioned above, during turn-on of the lighting system there can be a spike in current. Following the spike, the power supply regulates the output current to the desired level. The Bypass Turn-on Spike Current sub-circuit 10 is arranged so that the turn-on spike is not detected as an arcing event, and is instead ignored by the arc detection circuit. The sub-circuit 18 can comprise many different elements arranged in many different ways, with the embodiment shown comprising primarily amplifier 72 {U1C), transistor 74 (Q1) and surrounding resistor networks.

FIG. 10 shows first and second waveforms 74, 76 as shown in FIG. 8 above, with the first waveform 74 having the turn-on spike current and arcing events6. The second waveform 76 establishes the threshold for arcing events as described above. The third waveform 78 taken at point 80 in sub-circuit 18 shows the power supply voltage 28, and reflects that it is not instantaneous at turn-on and instead ramps up slowly. Because of this slow ramp-up, the arc detection circuit 10 does not detect the turn-on spike current and instead only detects the arcing events when at full power supply voltage. Fourth waveform 82 shows the detected arcing events as described above in FIG. 8.

Figure 11:
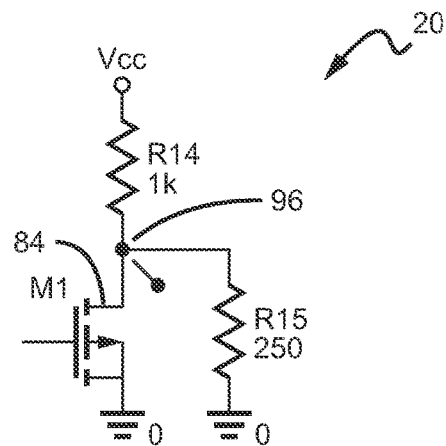
FIG. 11 is a detection signal to microcontroller circuit from the schematic shown in FIG. 2.

FIG. 11 shows a Detection Signal to Microcontroller sub-circuit 20 according to one embodiment of the present invention. This sub-circuit can comprise many different components coupled together in many different ways, with the embodiment shown comprising primary a transistor 84 and corresponding resistor network. The sub-circuit 20 is arranged to generate an arc detection signal that can then be send sent to the microcontroller to control operation of the power supply.

Figure 12:
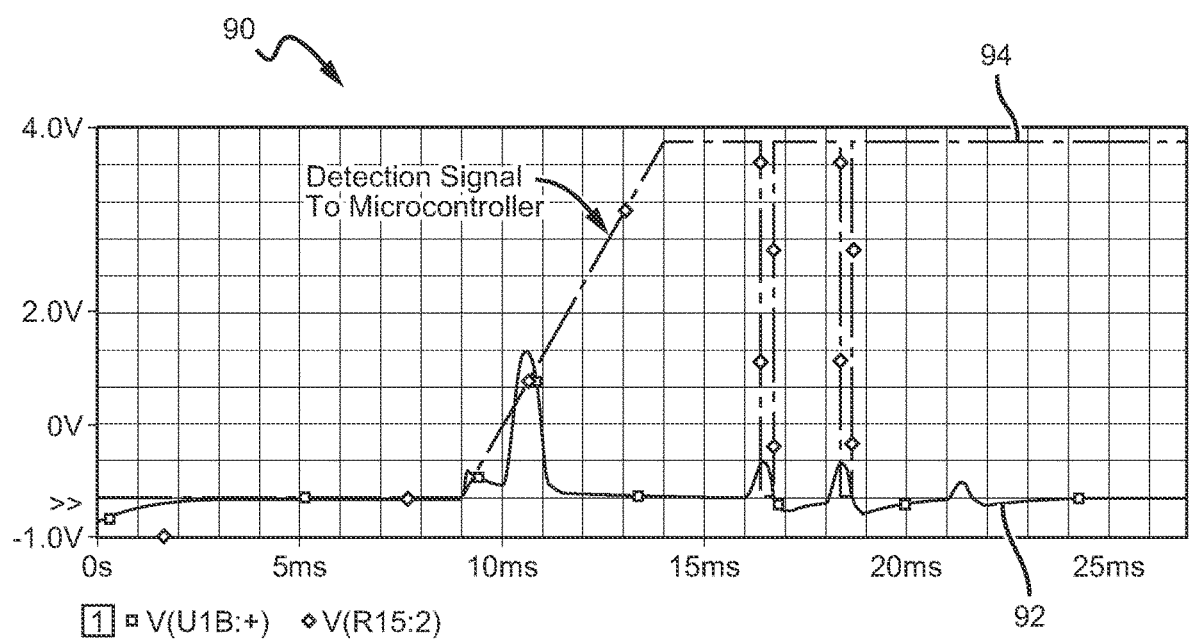
FIG. 12 is a waveform taken from one point as shown in the circuit of FIG. 11.

FIG. 12 shows a waveforms 90 showing a first waveform 92 showing the arcing events as described above. Second waveform 94, taken at point 96 in sub-circuit 20, is the arc detection signal to be sent to the microcontroller. In the embodiment shown and as shown in waveform 94, the sub circuit 20 generates a detect signal that is high (e.g. 5V) during normal operation. Once the arcing spike current is detected, the signal drops to a low (e.g. 0V) that is interpreted by the microcontroller to be an arcing event.

The microcontroller can take different actions in response to an arcing event. In some embodiments the microcontroller can turn off the power supply in to the first arcing event. In other embodiments the microcontroller can go through a series of steps to turn off the power supply for a short amount of time in response to an arcing event and then to turn the power supply on again to see if another arcing event occurs. This process prevents the power supply from immediately turning off in response to a single isolated arcing event, and instead only turns off is a series of arcs occur that present a danger of fire.

Figure 13:
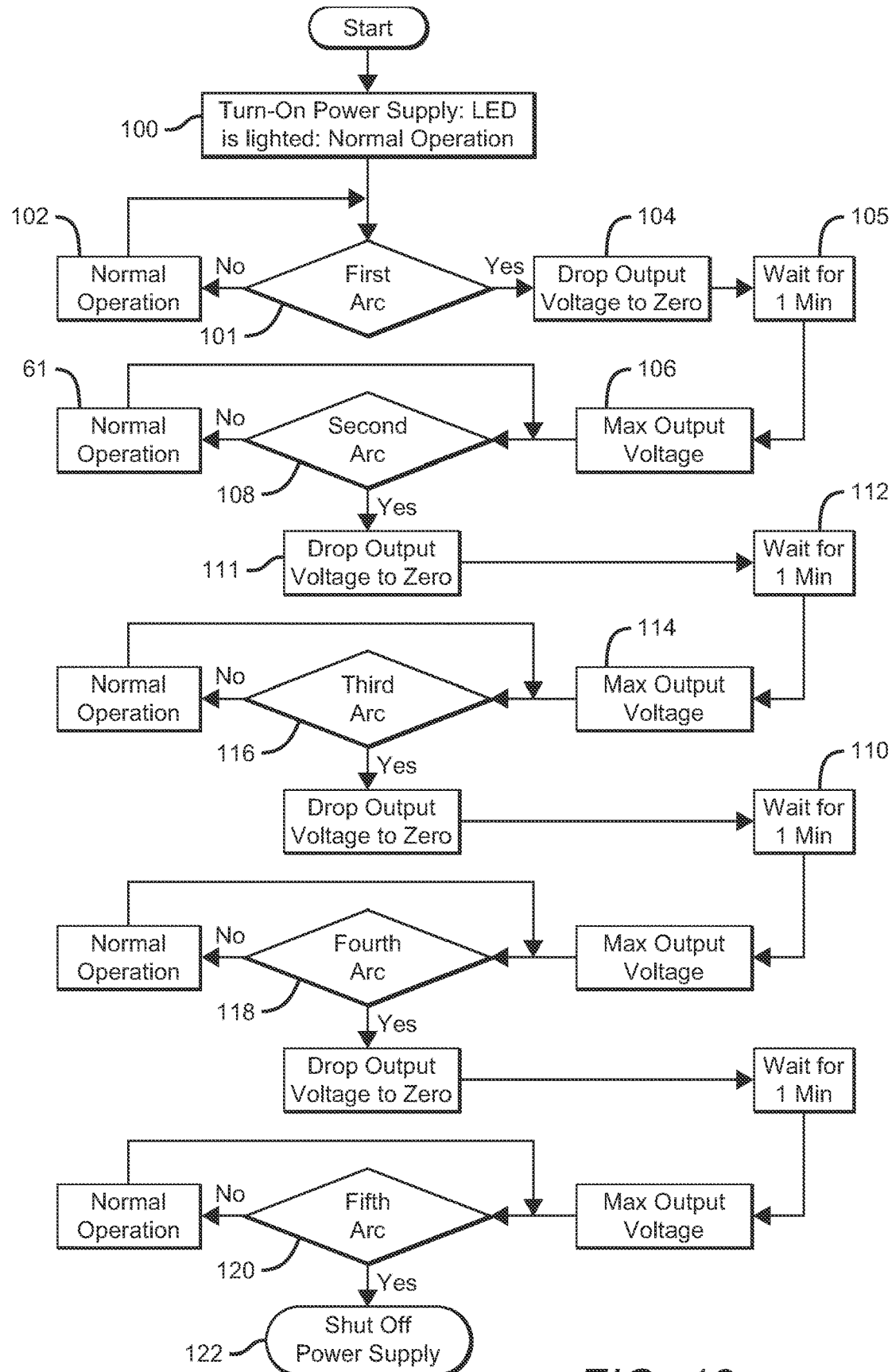
FIG. 13 is flow diagram showing operation of one embodiment of an arc detection system according to the present invention.

FIG. 13 shows one embodiment of a flow diagram showing this series of steps taken by the microcontroller in response to a series of arcing events. In step 100 the power is turned on to the power supply, the LEDs are energized and emit light, and the power supply proceeds in normal operation. In step 101, the arc detection circuit monitors for a first arcing event. If a first arcing event is not detected, in step 102 the power supply continues in normal operation. If a first arcing event is detected, in step 104 the arc detection circuit signals the microcontroller and the output power is brought to zero. In step 105, the microcontroller keeps the output voltage at zero for 1 minute.

After 1 minute and in step 106, the microcontroller causes the power supply to return to maximum output voltage. In step 108, the arc detection circuit monitors for a second arcing event. If there is none, in step 111 the microcontroller causes the power supply to continue in normal operation. If a second arcing event is detected, in step 110 the microcontroller causes the power supply output voltage to again drop to zero. In step 112 the microcontroller again holds the power supply voltage at zero for one minute before returning the power supply voltage to maximum at step 114.

In this embodiment, the microcontroller causes this turn-off and turn-on process to occur for third, fourth and fifth arcing events as shown in steps 116, 118 and 120. In step 122, when the fifth arcing event is detected the microcontroller causes the power supply to turn off and remain off until attended to by a repair technician or repair personal. In some embodiments, the arc detection system can include a means of alerting the repair technician that the power supply was turned off do to repeated arcing events. This can comprise a hardware alert such as lighting or mechanical indicator, or can comprise a software indicator that can be read by the repair technician. This arcing indicator can be important to directing the technician to the true cause of the power supply shut-down.

Figure 14:
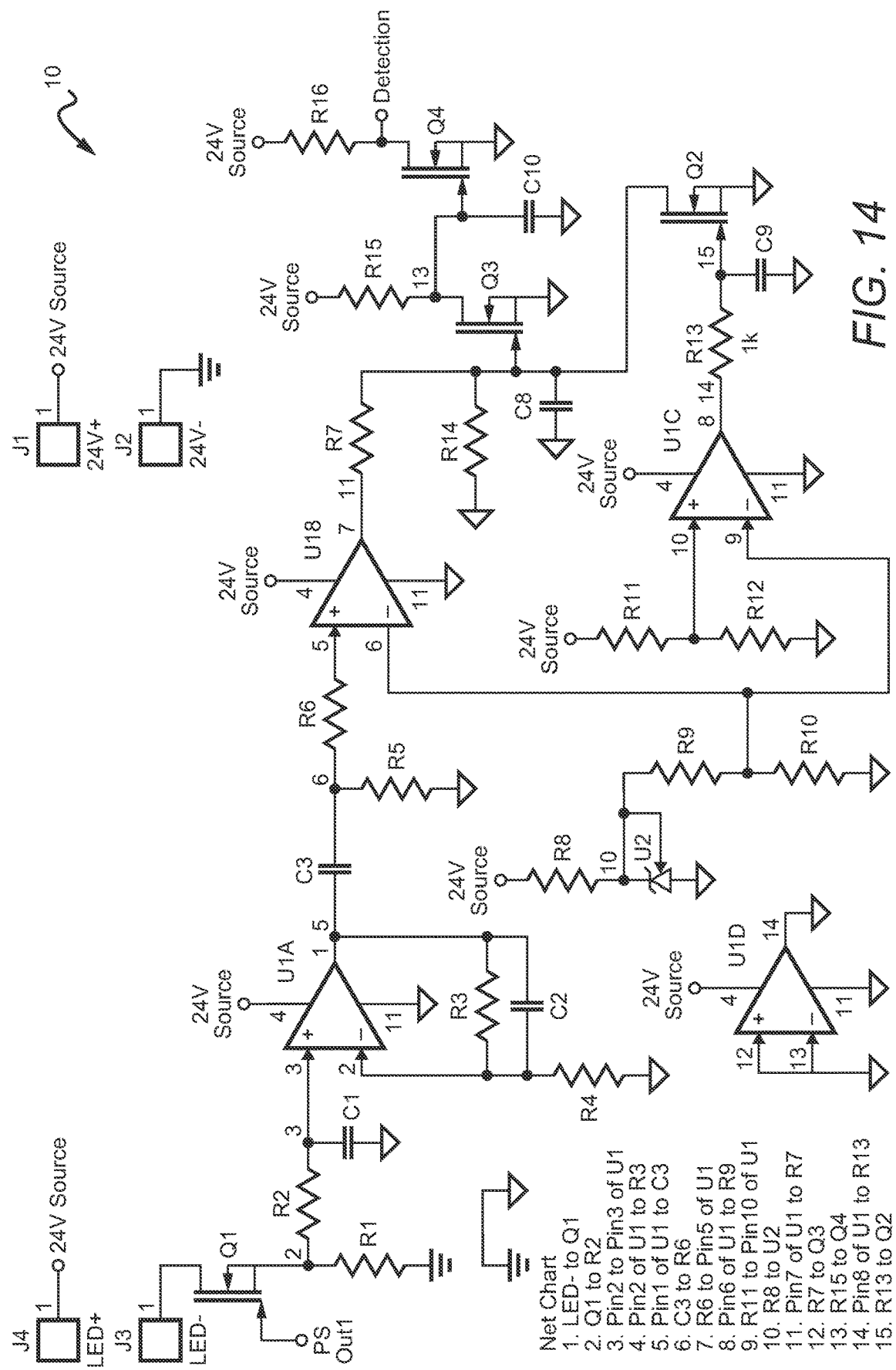
FIG. 14 is a schematic showing one embodiment of an arc detection circuit according to the present invention.
Figure 15:
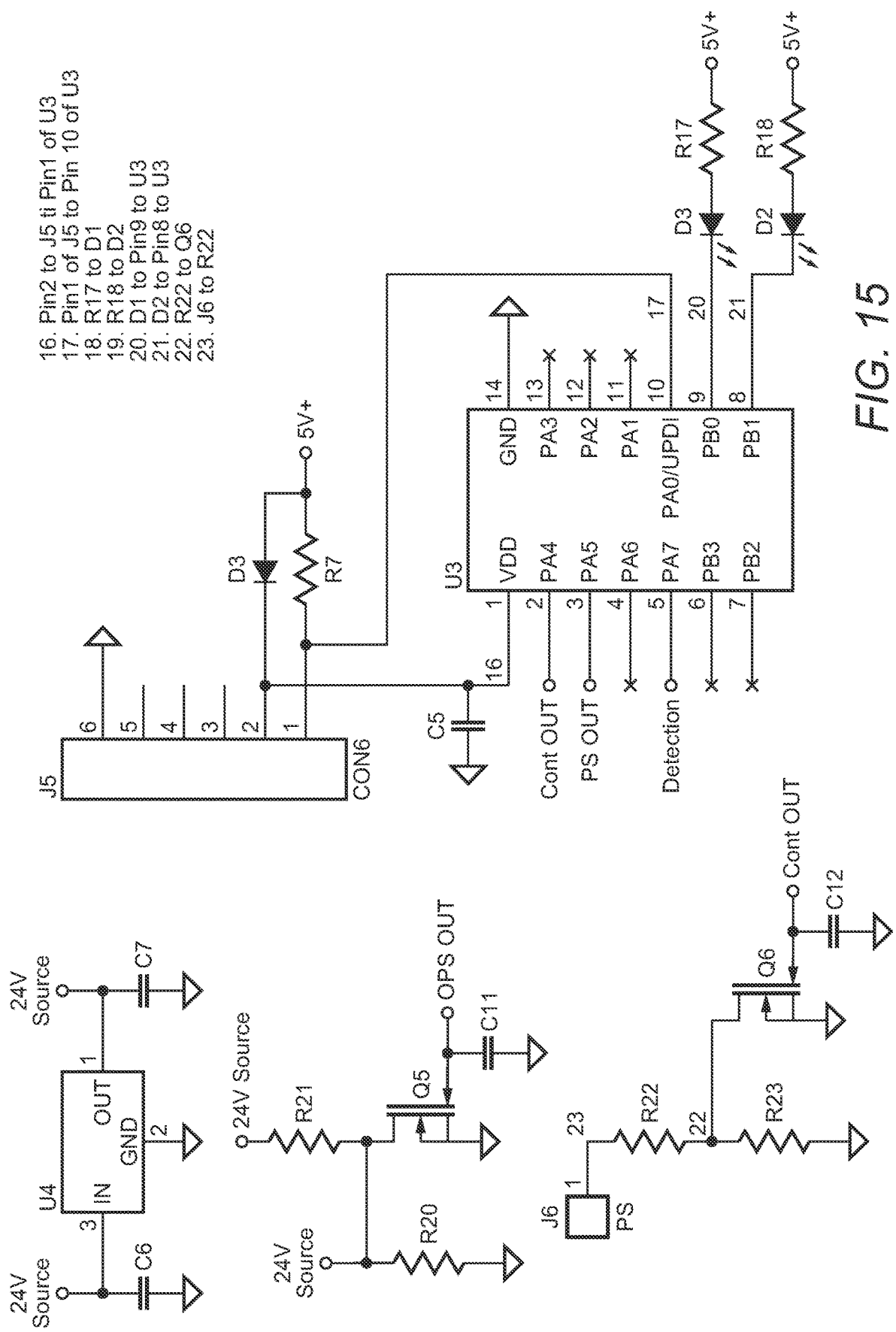
FIG. 15 is a schematic showing one embodiment of a microcontroller circuit that can be used arc detection systems according to the present invention.

FIG. 14 shows an arc detection circuit according to the present invention, and FIG. 15 shows a microcontroller circuit according to the present invention. The arc detection circuit provides a "Detection" signal to the microcontroller when an arcing event is detected. The microcontroller provides the necessary control signals to control the output voltage of the power supply. The microcontroller also has two indicator LEDs, one of which is an Arc LED that indicates an arcing event detected by the arc detection circuit.

Figure 16:
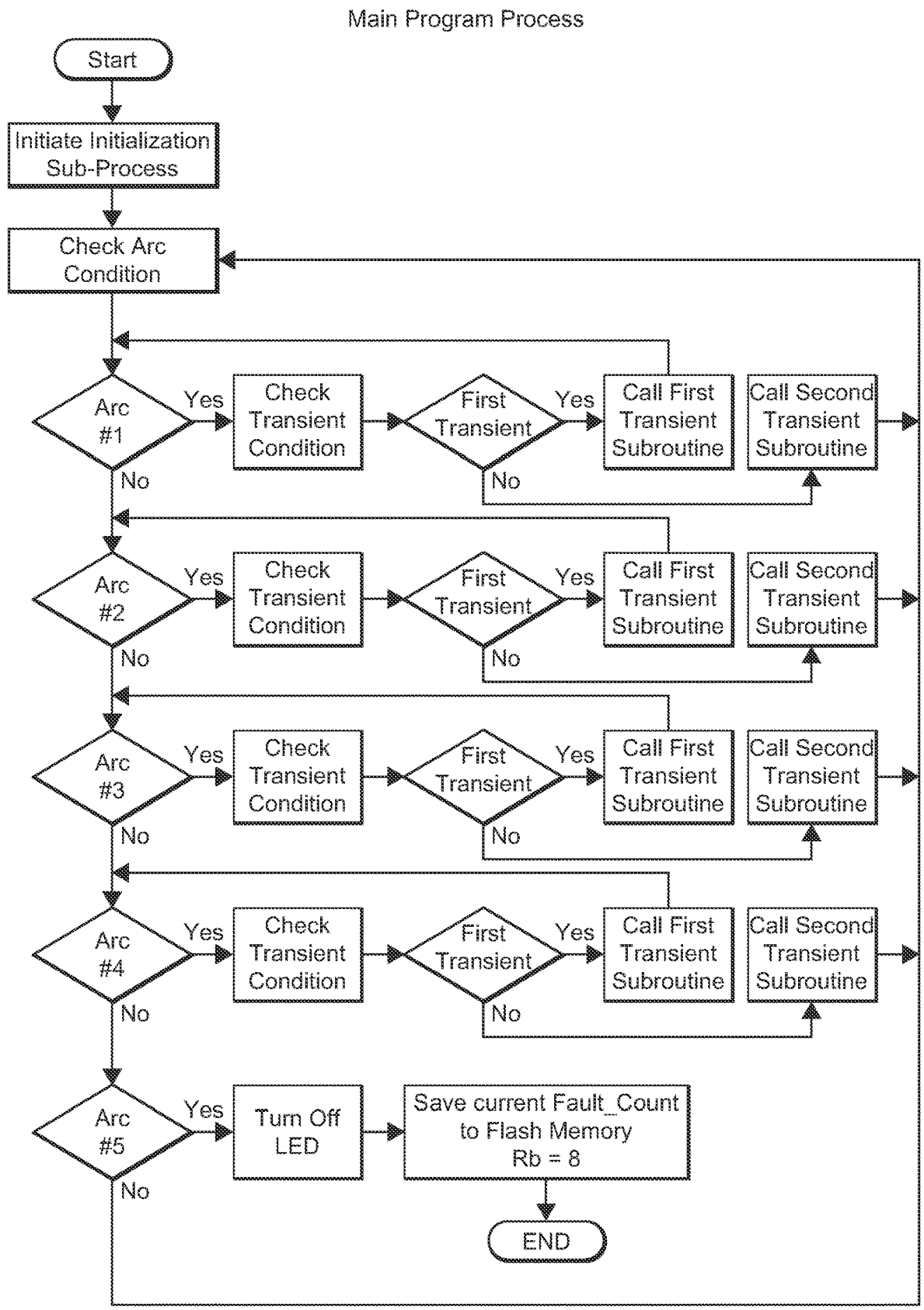
FIG. 16 is one embodiment of a software process flow diagram according to the present invention for implementing the flow diagram of FIG. 13.
Figures 17, 22:
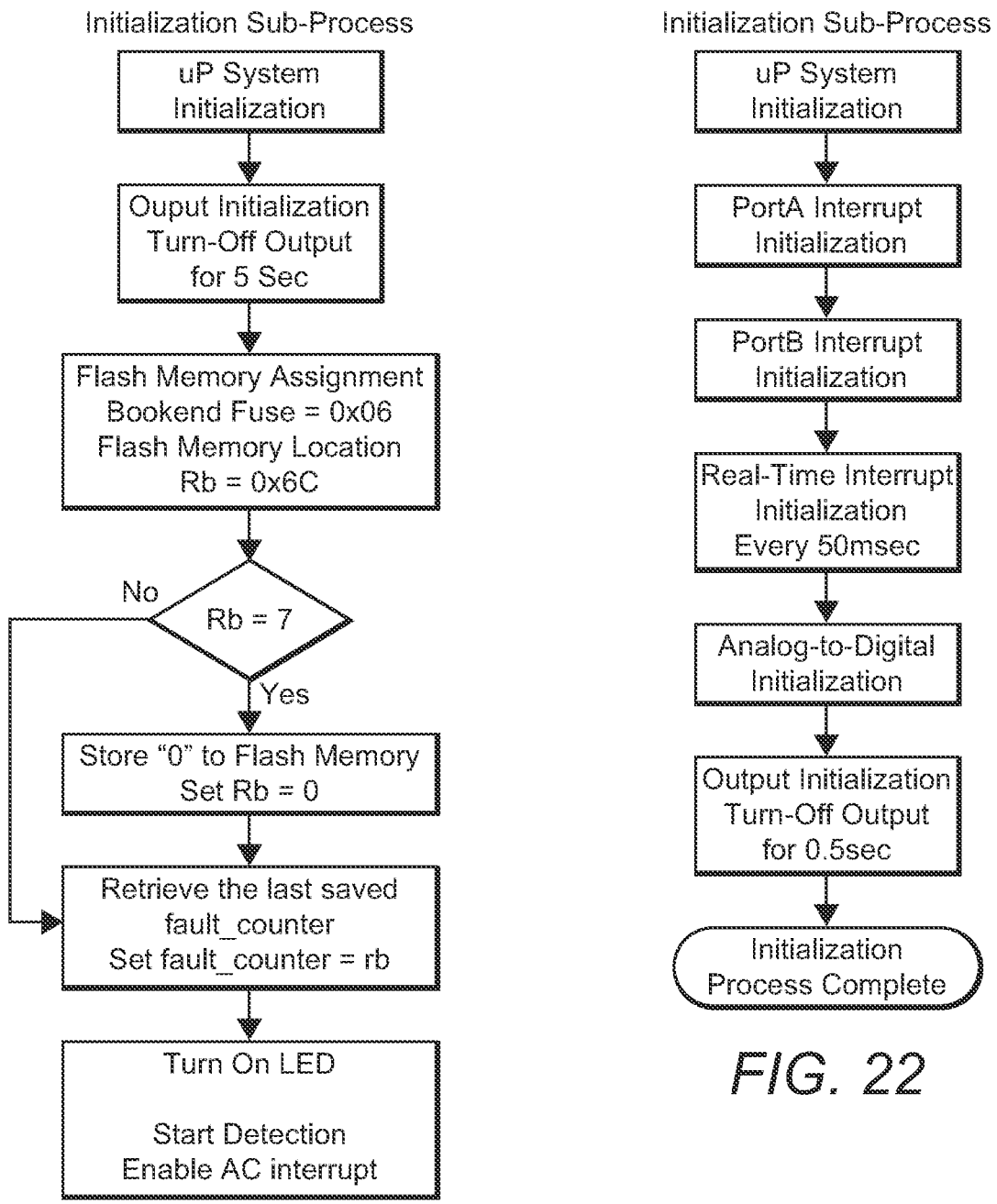
FIGS. 17 and 18 show one embodiment of software subroutines that can be used in the flow diagram of FIG. 16.
FIGS. 22 and 23 show one embodiment of software subroutines that can be used in the flow diagram of FIG. 21.
Figure 18:
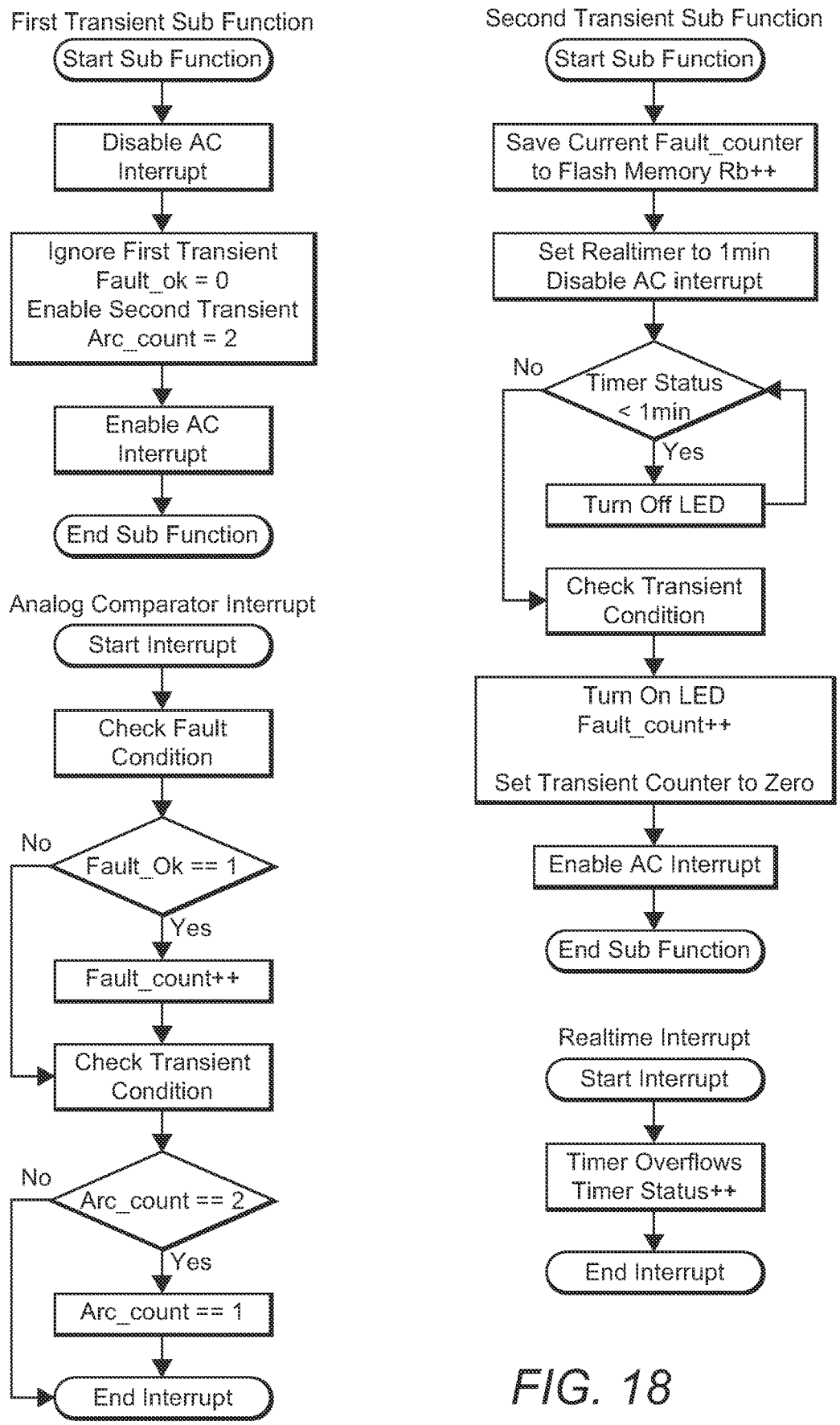

It is understood that the process of arc detection as provided for in flow diagram of FIG. 13 can be implemented using many different software routines and subroutines. FIG. 16 shows one embodiment of the main program process for one embodiment according to the present invention for implementing the steps in the process in FIG. 13. FIGS. 17-18 show one embodiment of software flow for sub-routines that can be used in the process flow of FIG. 16. It is understood that many different routines and sub-routines beyond those shown, and that the routines and sub-routines can implemented using different software languages.

Figure 19:
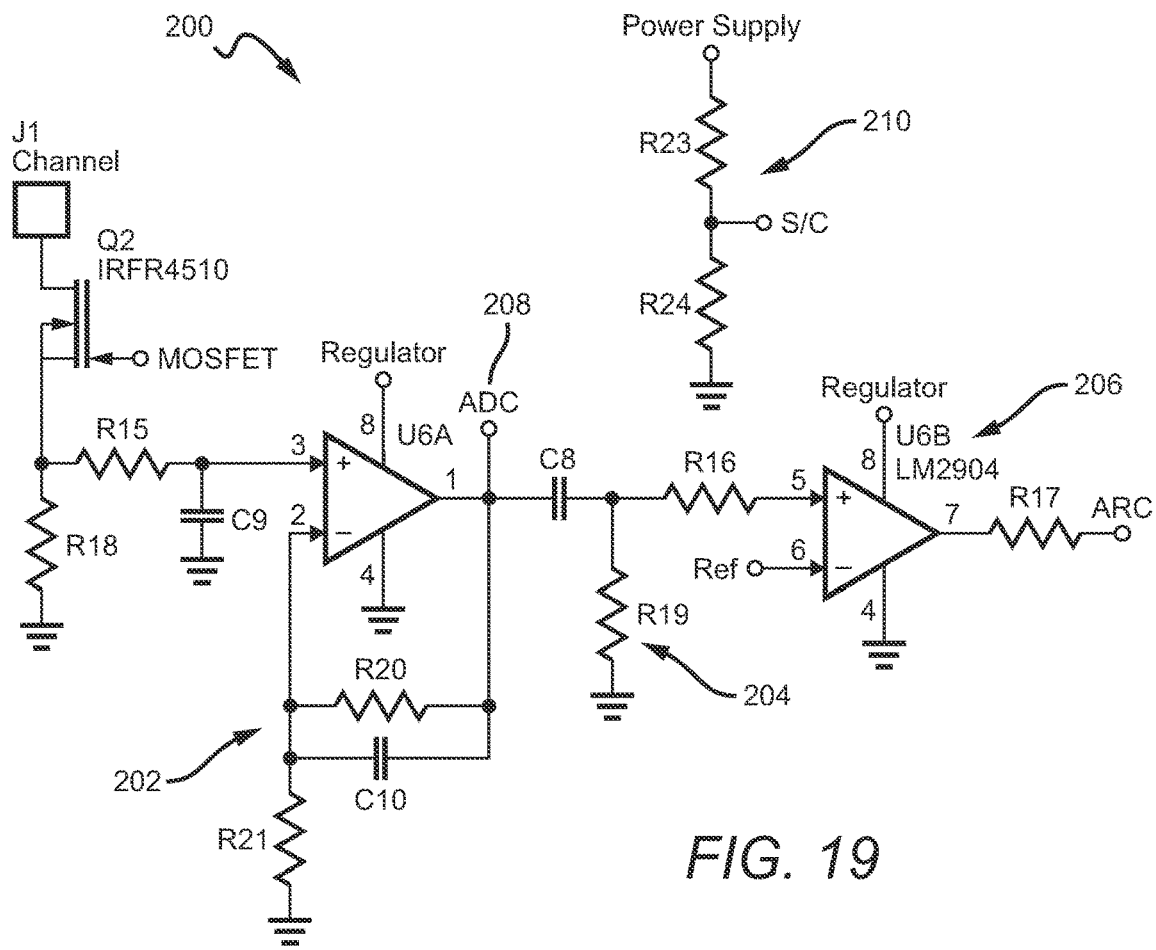
FIG. 19 shows another embodiment of an arc detection circuit according to the present invention.

As mentioned above, arc detection circuits according to the present invention can be arranged in many different ways, many different elements, and can have different features beyond the embodiments described above. FIG. 19 shows another embodiment of an arc detection circuit 200 according to the present invention. Like the arc detection circuit 10 described above, the circuit 200 comprises and Arc Current Amplification sub-circuit 202, a High Pass Filter sub-circuit 204, and an Arc Detection Circuit 206, and these sub-circuits function in much the same way as the corresponding sub-circuits in circuit 10. The circuit 200 differs from circuit 10 in that the functions of the Bypass Initial Spike sub-circuit are performed in the software run by the microcontroller, resulting in cost savings by eliminating certain hardware components.

The circuit 200 is arranged to also have other functions and capabilities. As described above with circuit 10, the Arc Current Amplification sub-circuit 202 has two current components, the arc current and DC operational current. When and arc condition is present, the arcing current component is separated from the DC operational signal component at the High Pass Filter sub-circuit 204, and the arcing current component is passed on to the Arc Detection sub-circuit 206. In the circuit 200, when arcing conditions are not present the DC component can be used by the microprocessor to determine other important operating conditions, such as over current operation. This DC component is read by the microcontroller at DC output 208 and the microcontroller can use the signal on this output to determine if an overcurrent condition has occurred.

The circuit 200 also comprises a Short Circuit Detection sub-circuit 210. When a short circuit condition exists, the output voltage of the power supply drops to zero, and the sub-circuit 210 detects this signal drops and sends a notification signal to the microprocessor. Pursuant to the above, the circuit 202 provides additional detection and notification capabilities compared to circuit 10 described above, and the circuit 2020 can be used on more than one channel.

Figure 20:
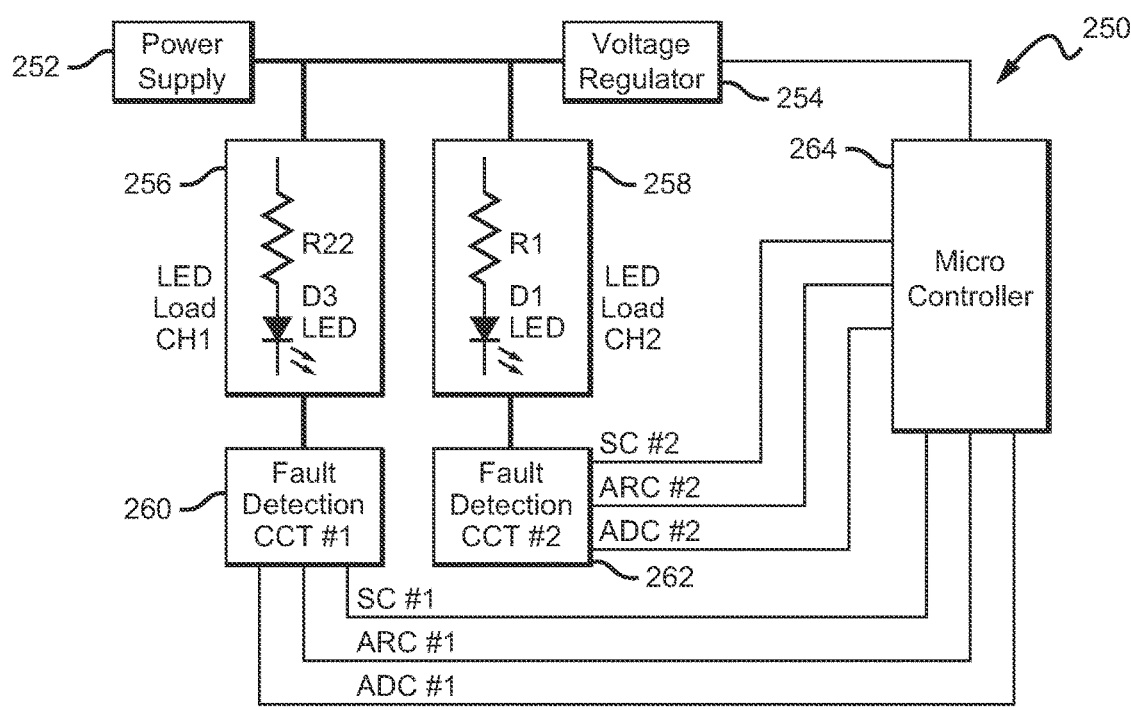
FIG. 20 shows one embodiment of a lighting system utilizing arc detection circuits according to the present invention.

FIG. 20 shows one embodiment of an LED based lighting system 250 utilizing arc detection circuits according to the present invention. The lighting system 250 comprises a power supply 252 and a voltage regulator 254 that drive first and second LED loads/channels 256, 258. First and second arc detection circuits 260, 262 are included, with each being coupled to respective one of the LED channels 256, 258. Each arc detection circuit generates short circuit (SC), arc detection (ARC), and DC overcurrent (ADC) signals that are conducted to the microcontroller 264. The microcontroller 264 and its software (described above) to control the voltage regulator (and power supply) in the event of short circuit, arcing or overcurrent operating conditions.

Figure 21:
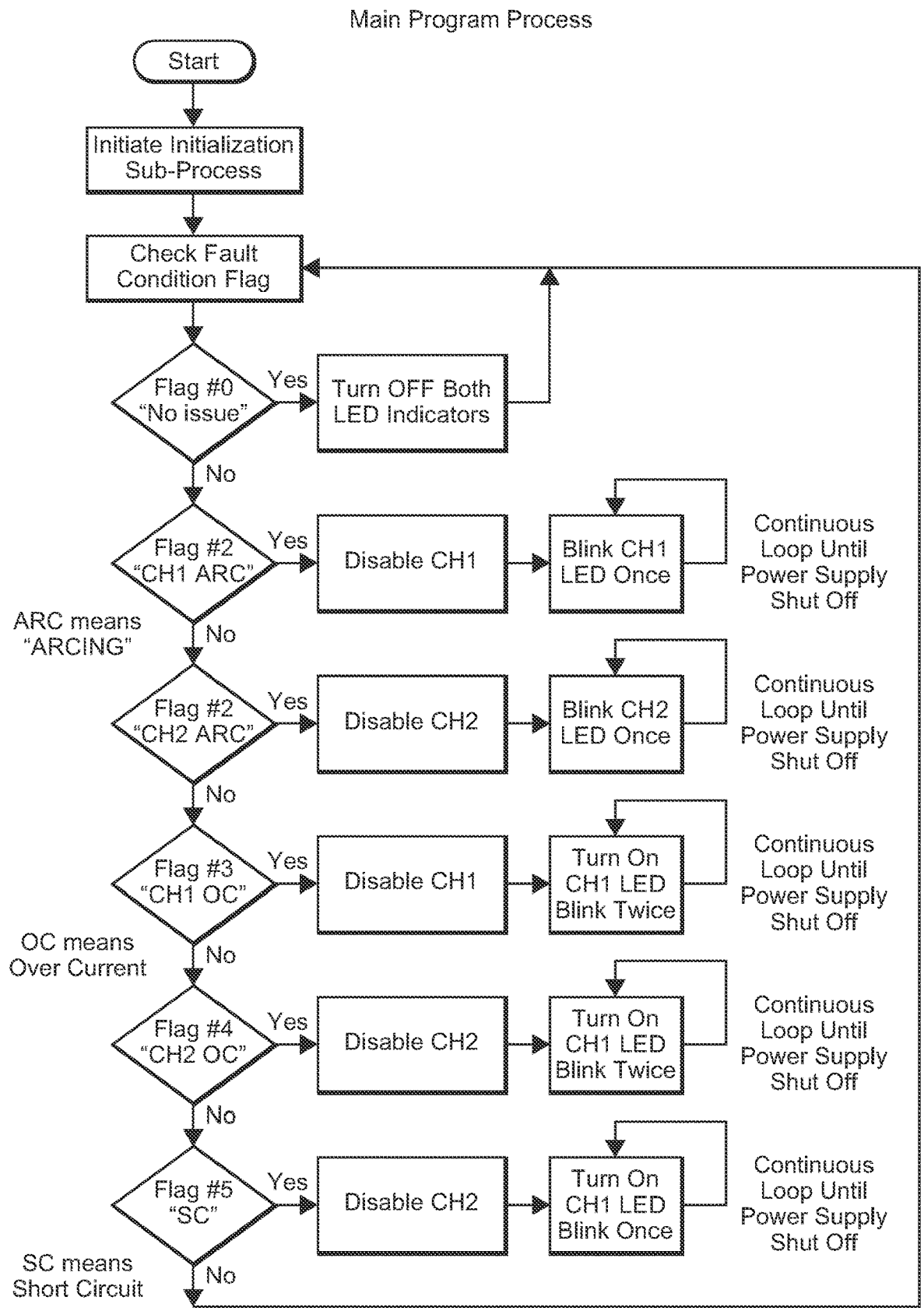
FIG. 21 is one embodiment of a software process flow diagram according to the present invention for implementing functions of arc detection circuit according to the present invention.
Figure 23:
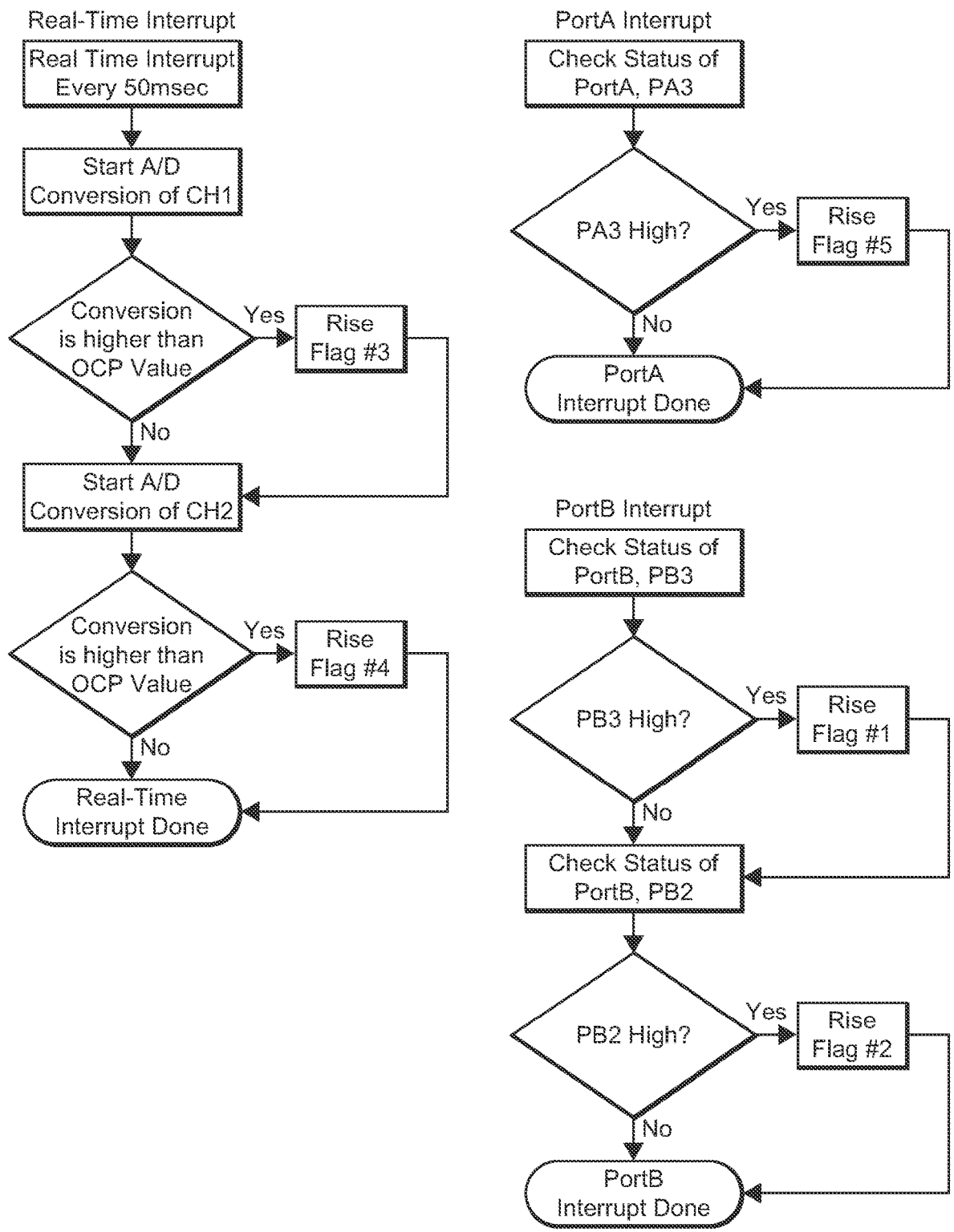

Like the embodiment above, the microprocessor software to coordinate and accomplish the functions of the circuit 200 can be arranged in many different ways. FIG. 21 shows the main program process flow for one embodiment of the software according to the present invention. FIGS. 22 and 23 show different embodiment of software sub-routines that can be used in the program shown in FIG. 21.

It is understood that many different mechanisms and arrangements can be used in the different systems according to the present invention. Although the present invention has been described in detail with reference to certain configurations thereof, other versions are possible. Therefore, the spirit and scope of the invention should not be limited to the versions described above.

I claim:

1. An arc detection circuit for, comprising:
   a high pass filter circuit arranged to accept an electrical signal with an arc current component having one or more arcing events and a direct current (DC) component, wherein said high pass filter passes only said arc current component;
   an arc detection circuit that accepts said arc current component and filters out arcing events below a threshold, said arc detection circuit providing an arcing signal with arcing events above said threshold; and
   a microcontroller that accepts said arcing signal to generate control signals based on said arcing signal.

2. The circuit of claim 1, further comprising an arc current amplification circuit to amplify said electrical signal before being provided to said high pass filter circuit.

3. The circuit of claim 1, further comprising an arc bypass initial spike circuit arranged to cause an initial turn on current spike not to be considered an arcing event by said arc detection circuit.

4. The circuit of claim 1, further comprising a detection signal to microcontroller circuit arranged to accept said arcing signal and modify said arcing signal before being accepted by said microcontroller.

5. The circuit of claim 1, arranged to detect arcing events in an LED based electrical system.

6. The circuit of claim 1, arranged to detect an arcing event in a light emitting diode (LED) based electrical sign system.

7. The circuit of claim 1, wherein said microcontroller control signals are used to control a power supply.

8. An LED based system, comprising:
- a plurality of light emitting diodes (LEDs);
- a power supply for supplying an electrical signal to said LEDs to cause said LEDs to emit light;
- an arc detection circuit arranged to detect arcing events in said system, said arc detection comprising;
- a high pass filter arranged to accept an electrical signal with an arc event current component and a direct current (DC) component, wherein said high pass filter passes only said arc event current component;
- a first sub-circuit that accepts said arc event current component and filters out arcing events below a threshold, said firs sub-circuit providing an arcing signal with arcing events above said threshold; and
- a microcontroller that accepts said arcing signal to generate control signals to control said power supply based on said arcing signal.

9. The system of claim 8, wherein said arc event current component comprises a plurality of arcing events.

10. The system of claim 8, wherein said arc detection circuit further comprises a second sub-circuit to amplify said electrical signal before being provided to said high pass filter.

11. The system of claim 8, wherein said arc detection circuit further comprises a third sub-circuit arranged to cause an initial turn on current spike not to be considered an arcing event by said arc detection circuit.

12. The system of claim 8, wherein said arc detection circuit further comprises a fourth sub-circuit arranged to accept said arcing signal and modify said arcing signal before being provided to said microcontroller.

13. The system of claim 8, arranged to detect arcing events between electrical conductors.

14. The system of claim 8, wherein said microcontroller comprises software to generate said control signals based on the arcing signal.

15. The system of claim 8, wherein said plurality of LEDs comprises two channels of LED each having a respective arc detection circuit.

16. A method for an electrical circuit to detect arcing events in an electrical system, comprising:
- a first step of monitoring the electrical signal driving an electrical system;
- a second step of separating arcing events on said electrical signal from the remainder of said drive electrical signal;
- a third step of detecting said arcing event;
- a fourth step of tuning off said drive electrical signal for a predetermined amount of time;
- a fifth step of restarting said drive electrical signal; and
- a sixth step of repeating said first through fifth steps a predetermined number of time before completing the final step of turning off said electrical signal until manually reset.

* * * * *